US006400306B1

(12) United States Patent
Nohara et al.

(10) Patent No.: US 6,400,306 B1
(45) Date of Patent: Jun. 4, 2002

(54) MULTI-CHANNEL MOVING TARGET RADAR DETECTION AND IMAGING APPARATUS AND METHOD

(75) Inventors: Timothy Joseph Nohara, Fonthill; Peter Thomas Weber, Dundas, both of (CA)

(73) Assignee: Sicom Systems, LTD, Fonthill (CA)

( * ) Notice: Subject to any disclaimer, the term of this patent is extended or adjusted under 35 U.S.C. 154(b) by 0 days.

(21) Appl. No.: 09/466,326

(22) Filed: Dec. 17, 1999

(51) Int. Cl.$^7$ .................. G01S 13/90; G01S 13/538
(52) U.S. Cl. .................. 342/25; 342/160; 342/195; 342/196; 342/352
(58) Field of Search .................. 342/25, 159–164, 342/175, 176, 179, 189–197, 352

(56) References Cited

U.S. PATENT DOCUMENTS

| | | | |
|---|---|---|---|
| 3,975,734 A | * 8/1976 | Payne ..................... | 342/25 |
| 3,993,994 A | 11/1976 | Goggins | |
| 5,122,803 A | 6/1992 | Stann et al. | |
| 5,539,408 A | * 7/1996 | Moreira et al. ........... | 342/25 |
| 5,767,802 A | * 6/1998 | Kosowsky et al. ....... | 342/25 X |
| 5,818,383 A | 10/1998 | Stockburger et al. | |

* cited by examiner

Primary Examiner—Bernarr E. Gregory
(74) Attorney, Agent, or Firm—R. Neil Sudol; Henry Coleman; William Sapone

(57) ABSTRACT

A radar detection and imaging system provides for the simultaneous imaging of the stationary objects on the earth's surface and the detection and imaging of moving targets. The radar system includes at least one transmitting aperture and a plurality of receiving apertures that are simultaneously operated in a synthetic aperture radar (SAR) mode caused by the motion of the satellite or airborne platform on which they are mounted. Each receiving aperture is connected to its own coherent receiver and the digitized signals from all receivers are processed to image both stationary clutter and moving targets. The system employs space-time adaptive processing (STAP) algorithms to better compensate for channel mismatches, better suppress stationary clutter, and to suppress mainbeam jamming. Moving target detection and estimation modules are also included and are their performance is improved as a result of the STAP algorithms. The system also employs SAR processing algorithms to create high-resolution images of stationary objects, and to image moving targets. The SAR and STAP algorithms are uniquely integrated in the radar signal processor (RSP) to provide improved performance while reducing the computational requirements, facilitating real-time implementation.

45 Claims, 7 Drawing Sheets

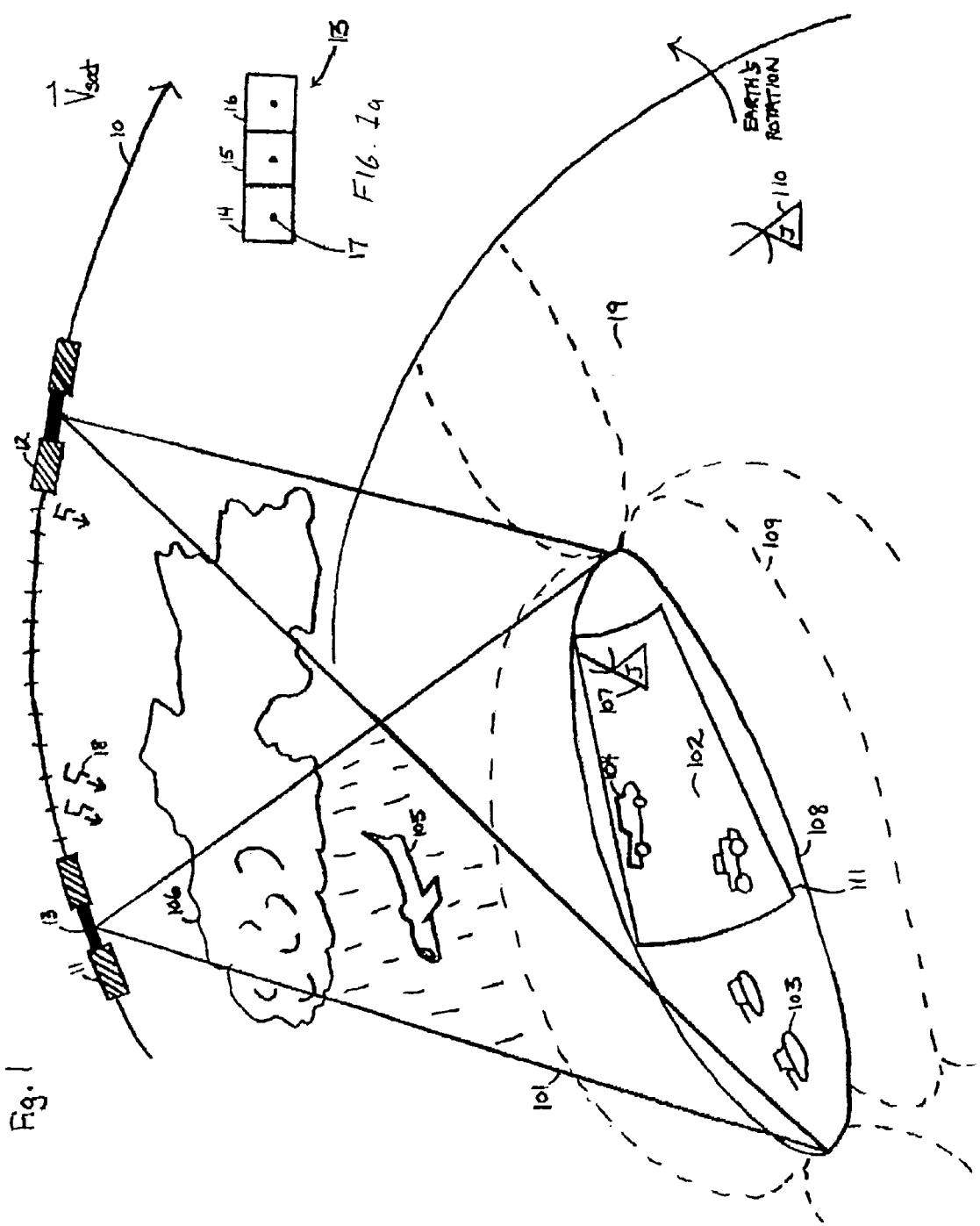

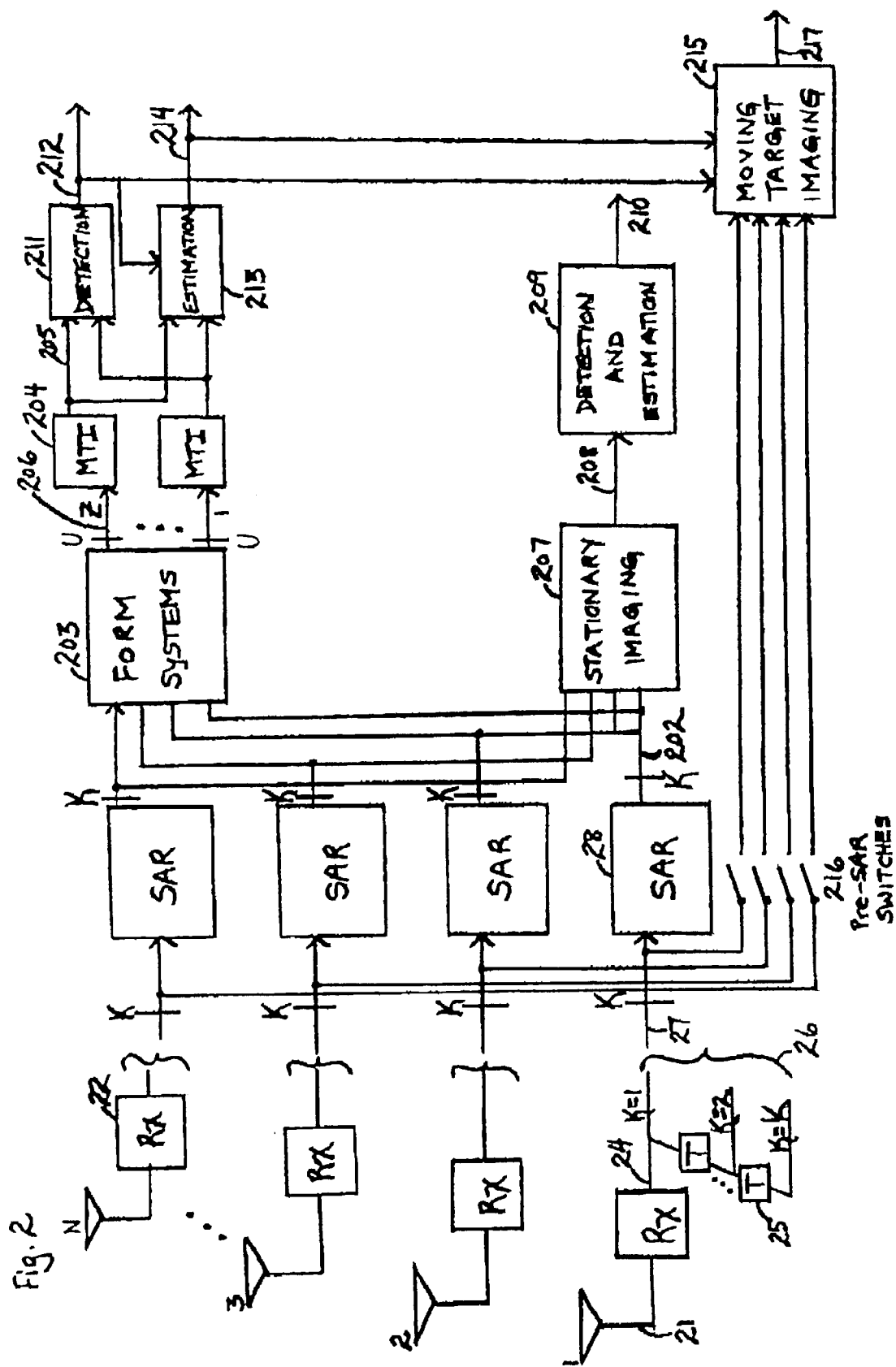

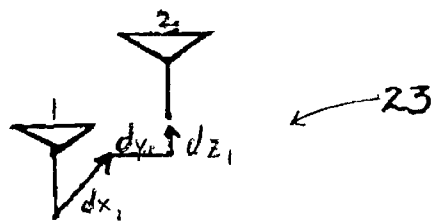
FIG 2a
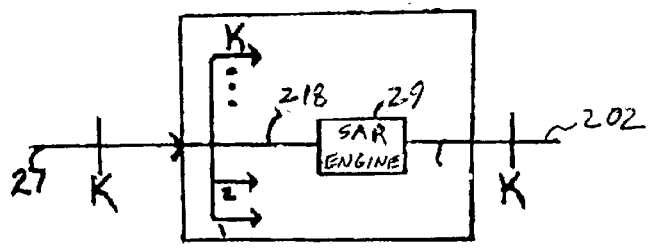
FIG 2b
FIG. 3  PRIOR ART
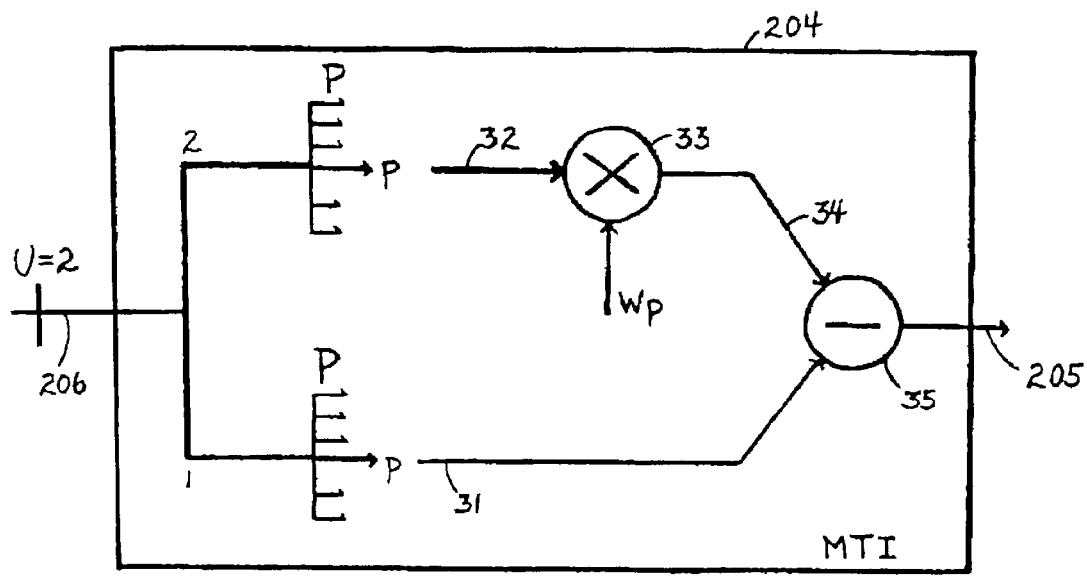

MULTI-CHANNEL MOVING TARGET RADAR DETECTION AND IMAGING APPARATUS AND METHOD

TECHNICAL FIELD

This invention relates to a space-based or airborne synthetic aperture radar (SAR) system with moving target indication (MTI). In particular, this invention relates to such a radar system that employs modern space-time adaptive processing (STAP) techniques to provide subclutter visibility of slow moving targets embedded in surface clutter.

BACKGROUND OF THE INVENTION

Synthetic aperture radar (SAR) systems are commonly employed on airborne and space-based platforms to provide high resolution imaging of the earth's surface and stationary targets. SAR systems are used in a variety of remote sensing applications. Most commonly, single-channel (i.e. one antenna connected to a single receiver) systems are employed. However, dual-channel systems (i.e. two antennas connected to two receivers) are of more recent interest and are used in applications requiring cross-track interferometry (which facilitates height determination) and polarimetric information (useful for identification of image features). SAR systems employ a variety of SAR signal processing techniques known and used by those skilled in the art. A general treatment of such techniques can be found, for example, in Curlander and McDonough, Synthetic Aperture Radar Systems and Signal Processing, Wiley, 1991. These techniques generally assume the objects being imaged are stationary. High resolution images are formed in the range and cross-range (also called azimuth) dimensions of the image using high-bandwidth waveforms, and long dwells which have the effect of creating a large synthetic aperture. Range compression techniques are generally employed to compress the coded waveforms, thereby producing the desired range resolution. Over the duration of the dwell, waveform pulses are transmitted and received coherently and subsequently compressed in azimuth to produce the desired azimuth resolution. Over the duration of the dwell, the moving platform carrying the antenna traverses a large distance relative to the real antenna aperture dimension, thereby forming a synthetic aperture. The resulting fine azimuth resolution is intuitively related to the dimensions of this synthetic aperture analogous to the (coarse) azimuth resolution associated with a real aperture. Depending on the application, but generally speaking, individual scatterers being imaged can walk in range and azimuth due to the motion of the platform. As a result, range and azimuth correction techniques are often required in addition to the range and azimuth compression steps. Other platform motion compensation steps may be additionally required, depending on the system and the application. These steps can either be done in the radar hardware (by adjusting oscillators and sampling times) or in the digital processing.

It is well understood by those skilled in the art that imaging moving targets using conventional SAR's has many problems making performance generally unacceptable for a variety of applications. Target motion can result in significant degradations in signal strength and image resolution, making detection of moving targets difficult or impossible. Furthermore, moving targets are displaced from their true locations in images, requiring additional estimation and correction techniques to be employed. Although there have been approaches suggested to provide a single-channel SAR with moving target detection and imaging (see for example Freeman and Currie, "Synthetic Aperture Radar Images of Moving Targets", GEC Journal of Research, Vol. 5, No.2, 1987), these approaches are applicable to a limited number of systems (usually airborne systems where a PRF several times larger than the clutter bandwidth may be employed) and applications (targets with sufficient radial velocity relative to the clutter bandwidth so as to move clear of the clutter).

To reliably detect slow and fast moving targets in clutter-limited scenes, moving target indication (MTI) techniques are generally employed, which combine signals from multiple (two or more) channels to suppress unwanted clutter and provide improved moving target detection and parameter estimation. When the radar is not moving (e.g. for ground-based systems), moving targets are easily detected by the simple use of pulse-canceler circuits. Only moving targets will have a Doppler shift away from DC (i.e. zero frequency) which allows them to escape cancellation by the pulse canceler. In airborne radar systems, returns from stationary objects (e.g. the ground or stationary targets) have non-DC Doppler shifts due to the motion of the platform. Those skilled in the art recognize that the mainbeam ground returns span a large clutter Doppler bandwidth that is proportional to the platform velocity and the azimuth beamwidth (resolution) of the antenna. The clutter bandwidth commonly spans the entire signal spectrum, thereby covering moving target returns. As a result, it is necessary to provide subclutter visibility in order to detect small moving targets. Many multi-channel systems and associated signal processing techniques have been developed to provide moving target detection and estimation for airborne radars. See for example iSkoinik, Radar Handbook, Second Edition, Chapter 16, McGraw-Hill Inc., 1990. These techniques are often referred to as AMTI (for airborne moving target indication) techniques. Moving targets can be both airborne targets and ground-based targets. Ground-based targets such as vehicles (including tanks and jeeps) travel slower than airborne targets such as aircraft and missiles. However, relative to the clutter, ground targets and air targets can both move slowly.

The large majority of moving target indication (MTI) systems and techniques have been developed for airborne radar systems. This is evident from the numerous open literature and patent literature publications. Furthermore, there are numerous airborne MTI radars in use today. For systems and techniques designed for operation in an air-to-air or air-to-ground mode, the term AMTI (for airborne moving target indication) has been generally used in the literature. Some airborne literature uses the term GMTI (for ground moving target indication), however, specifically for the air-to-ground mode. Description of space-based MTI radar systems and techniques is virtually nonexistent in the patent literature, and quite limited in the open literature. See for example Nohara et al., "A Radar Signal Processor for Space-Based Radar", 1993 IEEE National Radar Conference, April 1993, and Nohara, "Design of a Space-Based Radar Signal Processor", IEEE Trans. Vol. AES-34, No.2, April 1998. Furthermore, there are no known space-based MTI radars in use today. For space-based radars which operate in a space-to-air or space-to-ground mode, the term AMTI has been used for the former mode, and AMTI or GMTI for the latter mode, following airborne systems. Recognizing that for the most part, the same body of signal processing techniques and system elements are employed in air-to-air, air-to-ground, space-to-air and space-to-ground modes, the term MTI is deliberately used herein so as not to limit the scope of the invention to a specific space-to-air, space-to-ground, air-to-air or air-to-ground system or mode of operation, as well as to avoid confusion.

MTI techniques combine multiple channels to cancel or attenuate unwanted clutter. Selected multiple channels are combined by multiplying each selected channel by an appropriate weight and adding the resulting weighted channels together to produce the output, clutter-suppressed channel. If the weights used are fixed (i.e. pre-determined), then the signal processing techniques are referred to as "fixed" MTI techniques. On the other hand, if the weights are computed adaptively (i.e. they depend on the received data) as for example in Brennan et al., "Adaptive Arrays in Airborne MTI Radar", IEEE Trans. Vol. AP-24, September 1976, then the term "adaptive" MTI techniques is used. Adaptive MTI techniques have the potential to provide greater clutter suppression than fixed MTI techniques; but have higher processing costs. Fixed or adaptive MTI systems refer to systems employing fixed MTI or adaptive MTI techniques, respectively.

From the above discussion, one can deduce that integrating SAR and MTI techniques into a single system has the potential of providing reliable detection, estimation and imaging functions for both stationary targets and moving targets. Several airborne SAR-MTI systems and techniques have been proposed and a few systems are operational. Raney alludes to a simple two channel SAR that employs a simple two-pulse MTI canceler to reduce clutter (see Raney, "Synthetic Aperture Imaging Radar and Moving Targets", IEEE Trans. Vol. AES-7, No. 3, May 1971). In U.S. Pat. No. 3,993,994, Goggins describes a two-channel airborne SAR-MTI system where the DPCA (displaced phase center antenna) condition may or may not be satisfied (i.e. a trailing antenna's phase center occupies the spatial position of its adjacent, leading antenna's phase center an integral number of pulse repetition intervals later in time), and where SAR processing is performed independently on both channels followed by a simple, adaptive, two pulse canceler. A single adaptive weight is computed from the received data and applied to the trailing channel and updated over time in an attempt to compensate for adverse effects from unknown, uncalibrated, time varying parameters. In U.S. Pat. No. 5,122,803, Stan and Alexander describe an N-channel, sidelooking, airborne moving target imaging system that incorporates both SAR processing and MTI processing. The N-channels are arranged along the platform velocity vector so that a DPCA condition is satisfied. The effect is to spatially arrest the apertures for successive instants in time. SAR processing is performed on each of the N channels, followed by Doppler processing (which is similar to fixed-weight MTI processing in that the stationary clutter can be canceled by ignoring the DC Doppler bin) across the N channels. In the more recent U.S. Pat. No. 5,818,383, Stockburger et al. provide a different real-time, airborne, air-to-ground SAR-MTI solution which forms the basis of the JSTARS system. This system is designed to detect and locate ground moving targets in a manner quite similar to that described in Nohara et al., "A Radar Signal Processor for Space-Based Radar", 1993 IEEE National Radar Conference, April 1993, and Nohara, "Design of a Space-Based Radar Signal Processor", IEEE Trans. Vol. AES-34, No. 2, April 1998; except Stockburger et al. use fixed MTI rather than adaptive MTI. Once detected and located, the moving targets are then imaged and overlaid on SAR imagery of the scene containing the targets.

Stockburger et al. claim their approach is better suited for real-time implementation than Stan and Alexanders' approach since Stockburger et al. perform full-scene (i.e. for the full set of velocity and range cells) SAR processing only on a single channel, whereas Stan and Alexander do so on all N channels. Furthermore, Stockburger et al. claim their approach is better suited to accelerating targets, since they detect and estimate target parameters on subdwells, and only then form target images using the full dwell. Stockburger et al.'s approach suffers from poorer detection performance, however, when the integration gain that could be provided from the whole dwell is needed for reliable detection. This situation can arise for smaller targets, for slower targets which are more attenuated by the MTI filters, and for cases which are power or noise limited, as can occur in space-to-ground and space-to-air applications, where power is a premium, and where very large two-way propagation losses are standard. The approaches of Goggins, Stan and Alexander, and Stockburger et al. all suffer from channel-to-channel differences. Those skilled in the art will appreciate that uncompensated differences between the antennas and receivers can be the limiting factors in clutter suppression performance. For example, differences in antenna patterns due to mainbeam pattern differences and random sidelobe behavior must be corrected for improved performance. The fixed MTI filters used by Stockburger et al. and Stan and Alexander will not provided optimum performance in many cases. Furthermore, although an attempt was made by Goggins to use an adaptive weight, only a single adaptive weight is applied to correct all unknown differences between the two channels. This kind of adaptive weight is only capable of correcting for an overall channel gain difference and phase difference, and does nothing to compensate for antenna pattern differences, for example, which are a function of azimuth (or Doppler).

There are no known space-based SAR-MTI systems that are operational today, although space-based SAR-MTI is the subject of current research and development. Canada expects to have the world's first, space-based, experimental, SAR-MTI radar with the launch of Radasat 2 planned for 2002.

OBJECTS OF THE PRESENT INVENTION

An object of the present invention is to provide a SAR-MTI system suitable for space-based applications.

Another object of the present invention is to provide a SAR-MTI radar system having the ability to produce high-resolution SAR images of the earth's surface with detections from moving targets overlaid.

A further object of the present invention is to provide a SAR-MTI radar system capable of detecting, estimating parameters of, and imaging slow-moving targets in strong clutter.

Another object of the present invention is to provide a SAR-MTI radar system capable of detecting, estimating parameters of, and imaging targets free from clutter.

Yet another object of the present invention is to provide a SAR-MTI radar system that can simultaneously operate in SAR mode and MTI mode in parallel, using the same acquired data.

Still another object of the present invention is to provide a SAR-MTI radar system with improved detection performance and parameter estimation performance for small targets and slow targets.

Another object of the present invention is to provide a SAR-MTI radar system which uses adaptive MTI techniques to compensate for Doppler-dependent channel mismatches; and to provide improved clutter suppression performance.

An additional object of the present invention is to provide a SAR-MTI radar system that is robust or resistant to mainbeam jamming.

Yet another object of the present invention is to provide a SAR-MTI radar system with more flexible antenna/waveform design configurations.

A further object of the present invention is to provide a SAR-MTI radar system that has the SAR and MTI functions integrated so as to provide improved performance while reducing numerical computations.

A final object of the present invention is to provide a SAR-MTI radar system that is capable of real-time implementation.

SUMMARY OF THE INVENTION

In accordance with the present invention, a SAR-MTI radar system suitable for space-based applications includes a first plurality of transmitting antennas, and a second plurality of receiving antennas operatively connected to a set of coherent receivers which gather and digitize the RF signals collected by the receiving antennas. The digitized signals from each receiver channel are expanded to create a set of pseudochannels by passing each receiver's output signal through a delay network which provides a plurality of temporal taps, where each tap provides a different delayed version of the original signal. The pseudo-digitized signals are each processed using SAR processing techniques to create high-resolution SAR imagery of the stationary scene which may contain stationary targets. Detection and parameter estimation functions automatically detect and locate stationary targets from the scene imagery. The same pseudo-digitized signals are processed in parallel to detect, locate and image moving targets. Adaptive MTI processing techniques are employed to both compensate for unknown channel-to-channel mismatches and provide optimum clutter suppression, thereby improving the performance of target detection and parameter estimation. Separate detection and estimation functions are employed to automatically detect and locate moving targets. The moving target detections can be indicated on the SAR stationary scene imagery; or separate SAR moving scene imagery can be created for the moving targets.

In the present invention, the first plurality of transmitting antennas and the second plurality of receiving antennas can take many forms. In one form referred to herein as sequential antenna operation, the transmit antennas and the receive antennas are the same. A set of N antennas is provided. In a sequential fashion, the leading antenna transmits a pulse and receives the pulse echo, following by the next leading antenna which transmits a pulse and receives its echo, and so on, until all N antennas have operated. The cycle then continues again starting with the leading antenna. The sequential antenna form has the disadvantage of reducing the effective pulse repetition frequency (PRF) by a factor of N. In a preferred form referred to herein as simultaneous antenna operation, a single transmitting antenna is used to transmit all pulses, along with a set of receive antennas which simultaneously receive the radar echos resulting from the transmitted pulses. The antennas themselves could be separate, independently provided apertures, or they could be subapertures formed from one or more main apertures. Without loss of generality, in the sequel, we will assume the preferred, simultaneous antenna operation form unless otherwise indicated.

For space-based MTI applications, one skilled in the art can anticipate that improved clutter cancellation performance will be needed. Orbiting platforms in LEO orbits travel about 7 km/s, or an order of magnitude faster than most airborne platforms. As a result, the platform-induced clutter bandwidth that a radar designer needs to deal with can be an order of magnitude larger. The large field of view available to space-based radars and the potentially large surveillance footprints used to maintain high search rates mean that nonhomogeneous clutter is likely.

The present invention uses space-time adaptive processing (STAP) techniques in its adaptive MTI processing. The present invention is further unique in that it supports a whole taxonomy of STAP techniques which can be selected or tailored to the mission at hand. The spatial dimension is created by selecting signals from pseudochannels originating from different receivers but from the same temporal taps. The temporal dimension is created by selecting signals from pseudochannels originating from the same receiver but from a series of delays or taps. Space-time systems are formed by appropriately grouping the pseudochannel signals into multiple groups or systems. Adaptive MTI processing is used to suppress clutter for each system. Those skilled in the art will appreciate the improvement in clutter suppression that is possible when STAP techniques are employed, as compared to fixed-MTI systems. Furthermore, since the number of pseudochannels is in general larger than the number of actual receiver channels, larger space-time systems can be created with the present invention, making a larger number of adaptive degrees of freedom (ADOF) available. A larger number of ADOFs has many uses, one of which is to provide steeper and better clutter suppression filters that result in less attenuation for slow-moving targets that appear close to the filter's cut-off frequency. Hence, the minimum detectible velocity can be improved. In U.S. Pat. No. 3,993,994, Goggins provides only a single ADOF with no means to increase the number of ADOFs. In U.S. Pat. No. 5,818,383, Stockburger et al. do not use any ADOFs and employ only fixed MTI techniques.

A feature of the present invention is its ability to provide good MTI performance for situations when the phase centers of the receiving antennas are not aligned parallel to the platform velocity vector. In U.S. Pat. Nos. 3,993,994, 5,122,803, and 5,818,383, the phase centers are assumed to lie along the platform velocity vector; performance degradations result if this assumption is not maintained. In airborne systems, the phase center axis can be misaligned from the platform velocity vector as a result of wind or turbulence, or by design (for example, when the antennas are part of a rotating system). In space-based radars, a unique situation arises due to the impact that the earth's rotation has on ground scatterers. For orbiting platforms, the earth's rotation causes a Doppler spread to impart on radar echos from mainbeam ground scatterers. This Doppler spread can be quite substantial and must be compensated, as it has the same effect as the platform-induced clutter Doppler bandwidth. One way to compensate for the effects induced by the earth's rotation is to yaw the antenna axis a sufficient amount to cause the zero Doppler centroid to shift to broadside. In this case, the receive antennas are misaligned from the platform velocity vector by design. Indeed, one could derive other reasons for designing receive antenna phase centers that are not restricted to lie on an axis parallel to the platform velocity vector. For example, having the phase center axis pitched relative to the velocity vector can improve DPCA cancellation for squinted looks. The availability of a user-specified number of ADOFs and the use of adaptive MTI techniques make the present invention's performance robust to such conditions and designs.

The availability of extra ADOFs afforded by the present invention can be used to provide mainbeam jamming suppression in addition to clutter suppression. For space-based MTI applications, the footprint can be very large increasing the odds of encountering mainbeam jamming. Systems which employ fixed MTI processing will not be robust to jamming. Systems employing at least two spatial ADOFs can use one ADOF for clutter suppression, and the second to cancel a mainbeam jammer. Systems with additional ADOFs have the ability to suppress additional mainbeam jammers.

Another feature of the present invention is its robustness in MTI performance when the receiving antenna phase centers do not satisfy the DPCA condition. The systems described in U.S. Pat. Nos. 3,993,994, 5,122,803, and 5,818,383 require the DPCA condition to be satisfied if acceptable MTI performance is to be maintained. For a fixed antenna design with fixed phase center spacing, airborne systems such as those in the aforementioned patents would have to adjust the waveform PRF to maintain the DPCA condition when the velocity of the aircraft changes from the design velocity. It is desirable in most radar systems to have the flexibility to optimize the PRF for target detection or image formation, rather than for clutter suppression. The use of adaptive MTI techniques in the present invention allows one to decouple the PRF from the platform velocity by implicitly interpolating a DPCA solution adaptively from the multi-channel signal data. In space-based applications, the platform velocity is highly stable; as a result, the PRF can be optimized for SAR imaging or for a desired MTI response for moving target detection.

The adaptive MTI techniques used in the present invention are generally applied in the frequency domain. That is, adaptive clutter suppression weights are independently computed for each Doppler bin. Since Doppler is related to azimuth, this approach compensates for mismatches in the mainbeam and sidelobe antenna patterns of the receive antennas as a function of azimuth, thereby improving clutter suppression. Depending on the extent of the processed scene, a single adaptive weight could be computed for each Doppler bin to be used for all range bins, or the weights could be recomputed in a block fashion for groups of range bins. These adaptive MTI approaches also optimize clutter cancellation performance in the presence of nonhomogeneous clutter.

A unique feature of the present invention is that the SAR-MTI radar signal processing architecture can be tailored by the system operator to the mission at hand. This tailoring begins by specifying the number of space-time groups to be used, the type of STAP algorithm that will be employed in the adaptive MTI processing (a discussion of some important STAP algorithms supported is provided in the sequel), and the number and type (spatial and/or temporal) of [pseudochannels required. SAR processing using conventional SAR algorithms is performed on each of the specified pseudochannels. The operator can specify which of the SAR-processed pseudochannels will be combined and used for SAR stationary scene image. In the simplest case, one of the SAR-processed pseudochannels can be used directly as the stationary scene image. Automated detection and estimation functions can then be applied to the stationary scene image to detect and locate stationary targets. In parallel, the SAR-processed pseudochannels are also grouped into the specified space-time systems and adaptive MTI processing is performed on each system to suppress clutter and jamming. The output signals from the available systems are then used by moving target detection and estimation functions. One or more of the MTI output signals can be combined for detection and/or estimation. Conventional constant false alarm rate (CFAR) detectors known to those skilled in the art are generally used to detect moving targets. CFAR detectors work well for both clutter-limited and noise-limited conditions. The estimator functions employed can be conventional maximum likelihood (ML) estimators, or empirically derived estimators. Two special cases supported by the present invention are SAR-only or MTI-only modes. For SAR-only modes, the parallel MTI path in the radar signal processor (RSP) is disabled. For MTI-only modes, the SAR stationary scene image and detection and estimation functions are bypassed.

A preferred embodiment suitable for space-based applications (and airborne as well) has two receive antennas. The DPCA condition is approximately satisfied, which facilitates clutter cancellation. Additional ADOFs are created by providing up to three temporal taps in the delay network used on each receiver channel, creating between 2 to 6 pseudochannels. SAR processing is performed on the pseudochannels, and one of the SAR-processed pseudochannels is used as the stationary scene image. Detection and localization of stationary targets may follow. A single space-time system is formed from the available SAR-processed pseudochannels in accordance with a selected STAP algorithm. The STAP algorithm can take the form of a simple adaptive DPCA algorithm (in this case, only two pseudochannels are formed using a single delay tap from each receiver channel) employing a single ADOF, to more advanced STAP algorithms which utilize four or six pseudochannels (i.e. by processing the signals from two or three delay taps, for each receiver). The output signal from the space-time system represents an image of moving targets. Detection and estimation functions may be performed on this signal to detect and locate targets. These detections can then be overlaid on the SAR stationary scene image.

In U.S. Pat. No. 5,818,383 by Stockburger et al., SAR imaging of moving targets is only performed in the vicinity of detected moving targets. This is achieved by doing MTI over shorter subdwells and detecting and estimating target locations for each subdwell. A target track is developed for each target by filtering the target estimates obtained from the set of subdwells which span the full SAR dwell. The target tracks are then used along with the full-dwell signal from one receiver channel to create SAR imagery for each of the detected moving targets. While this approach is a special case of the present invention where the conventional SAR function is replaced by conventional pulse Doppler processing over the set of subdwells, the present invention in its general form has two advantages over the system proposed by Stockburger et al. First, by doing SAR processing on each of the pseudochannels before MTI processing, moving target imagery is formed in batch for the entire scene; not simply at locations where moving targets are detected. This is analogous to creating for a radar operator a full plan position indication (PPI) display, rather than a synthetic PPI display containing only the binary detections. Radar operators can usually interpret additional useful information from the full PPI display as compared to the synthetic PPI display. In the same way, the SAR moving target scene imagery created by the present invention is a useful output of the system. Second, the detection performance for very slow or small moving targets is better for the present invention because the coherent integration gain provided by SAR processing (i.e. use the full dwell) precedes detection. As a result, detection is performed for a target signal with higher signal to interference plus noise ratio (SINR). While it is realized that the full coherent integration gain can only result for nonaccelerating targets, this situation is true or approximately true in many applications. In applications where shorter SAR dwells are used (i.e. on the order of one second rather than up to 10 seconds as described by Stockburger et al.), the nonaccelerating target assumption can be quite valid. Most existing space-based SAR systems fall into this category.

A final feature of the present invention is its ability to be implemented in real-time for many applications, if necessary. Although the computational requirements can be quite demanding especially when multiple ADOFs are employed, the exponential improvements in computing power and the ability to partition the problem across multiple processors make real-time implementation possible on customized computing hardware. In U.S. Pat. No. 5,818,383, Stockburger et al. claim that providing moving target imagery for the entire scene does not allow for real-time implementation. While this may have been the case for JSTARS on the selected computing hardware, it is not the case in general, especially with today's improvements in computing technology (and future improvements still expected). Stockburger et al. considered very long dwells on the order of 10 seconds (with 1 ft. resolutions). When shorter dwells and lower resolutions are employed as would be the case for many applications (especially surveillance applications), the computational requirements can often be reduced. In other applications, processing is done on the ground where larger and faster computers can be used for real-time implementation. For example, most space-based SAR systems do their radar signal processing on the ground. Finally, in many applications, real-time processing is not even a requirement. As a result, RSPs employing more sophisticated and computationally demanding processing such as in the present invention are practical today.

Finally, a preferred embodiment of the present invention facilitates real-time implementation by a clever and innovative integration of the SAR and MTI functions. The SAR function is broken up into a coarse Doppler stage followed by a fine Doppler stage. The MTI operation is moved forward within the SAR function, immediately after the coarse Doppler stage, so that the number of pseudochannels is reduced by the MTI operation before completing the fine Doppler stage. This reduction in channel count before proceeding with the computationally intensive fine Doppler stage results in significant reductions in computational costs. Furthermore, improvements in the resulting moving target SAR imagery are possible by estimating target dynamics after the coarse Doppler stage, and exploiting this knowledge in the fine Doppler stage, thereby providing a means for autofocusing.

In the sequel, more detailed descriptions of preferred embodiments of the present invention are presented, which bring to light other objects, features and advantages of the present invention. The drawings employed and the ensuing discussions are not intended to limit the scope of the present invention, but rather to provide insight into certain aspects of the present invention.

BRIEF DESCRIPTION OF THE DRAWINGS

FIG. 1 is an illustration of an application or operational environment for which the present invention is used.

FIG. 1a is an illustration of an antenna array useable in connection with the present invention.

FIG. 2 is a functional block diagram of the general form of an SAR-MTI system under the present invention.

FIG. 2a is a detail showing a general relative pairwise geometric arrangement of the antennas as illustrated in FIG. 2.

FIG. 2b is a detail of the functional block diagram of FIG. 2, showing an internal functionality of a SAR processing module.

FIG. 3 illustrates a block diagram of a fixed MTI algorithm used in some of the prior art.

DETAILED DESCRIPTION OF THE INVENTION

Figure 4:
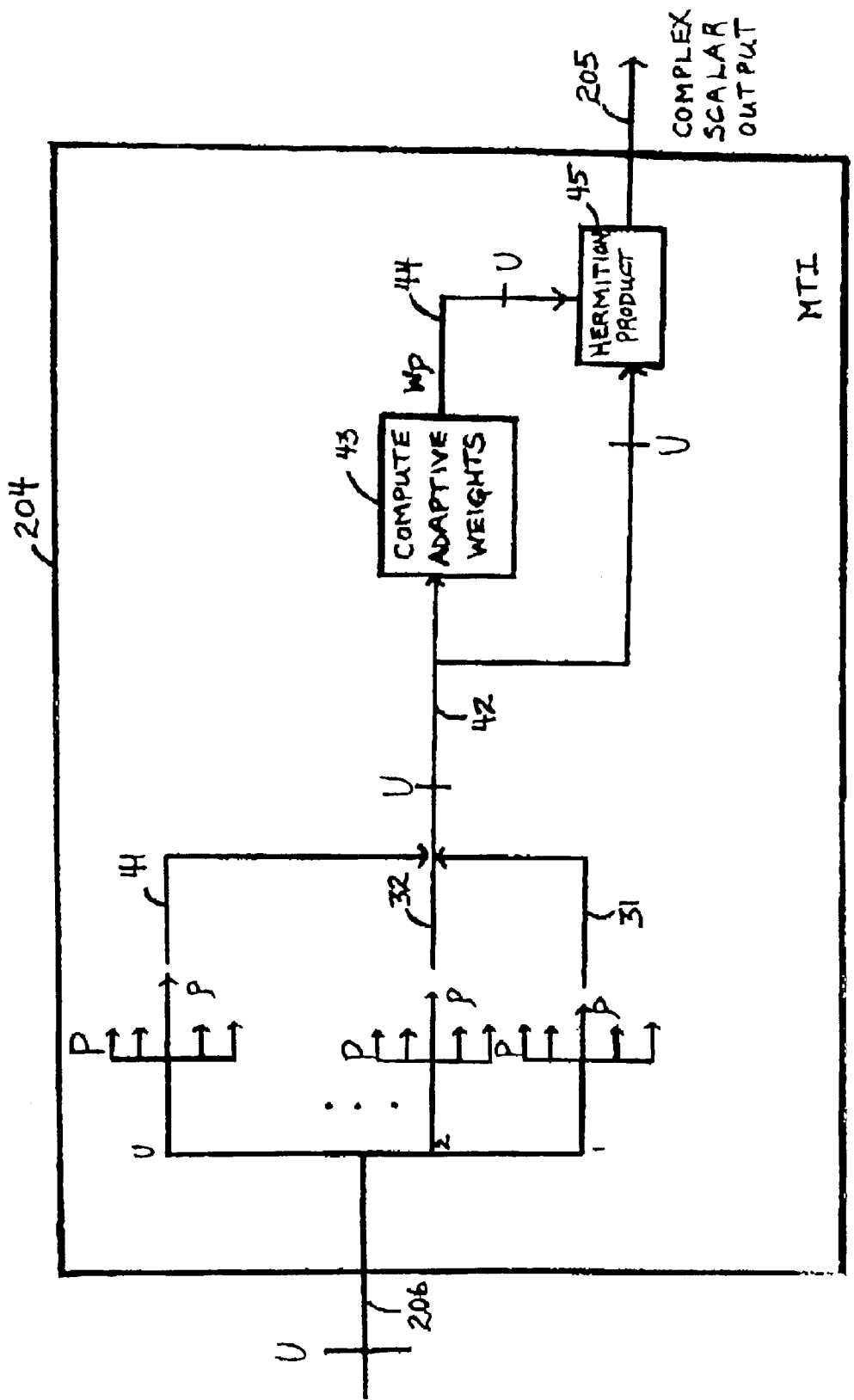
FIG. 4 illustrates a block diagram of the adaptive MTI algorithm which is a unique feature of the present invention.

A SAR-MTI system is typically used to provide high-resolution imagery of a stationary surface, and to detect, localized and image stationary and moving targets, all from a moving radar platform such as a spacecraft or an aircraft. In FIG. 1, a space-based surveillance application is illustrated which is an application well suited to the present invention. A satellite orbit 10 is shown along with a satellite at the start 11 and end 12 of a surveillance dwell. The satellite carries a radar system 13 which includes a number of antennas for transmitting pulses 18 directed towards the earth's surface 19 (the earth's surface could obviously be replaced with the surface of other planets or moons) and receiving pulse echos from the earth's surface and from stationary and moving objects on or above the earth's surface. In this example, the radar system includes three antennas, as shown in FIG. 1a. One antenna 15 is used for transmitting while two antennas (14 and 16) are used for receiving in this example. (In practice, an arbitrary number of antennas could be provided, and any subset of them could be used for transmitting and/or receiving.) The combined effect of the transmit antenna pattern and the receive antenna pattern for each receive antenna is to create a surveillance beam 101 wherein the transmitted pulses interact with the scene containing the earth's surface 102, ground moving targets such as tanks 103 and vehicles 104, airborne targets 105, weather 106 and jammers 107. Conventional radar pulses (e.g. linear frequency modulated (FM), nonlinear FM or phase coded pulses) are transmitted at a regular pulse repetition interval (PRI) which has the effect of spatially sampling the trajectory of the satellite. The synthetic aperture is characterized by the distance the radar travels over the course of the dwell. Due to the large velocity of the spacecraft (typically about 7 km/s), a synthetic aperture length greater than 10 km is not uncommon. The dwell duration is limited to ensure that the ground scene to be imaged is kept within the mainbeam footprint 108 over the whole dwell. If longer dwells are required, spotlighting could be used. For typical orbits, the mainbeam footprint can be as short (in the ground range dimension) as tens of kilometers, and as long as 1,000 km or more. Footprints 109 associated with the antenna sidelobes are also illustrated. Radar echos originating from mainbeam ground scatterers are referred to as mainbeam clutter in the context of MTI radars, and radar echos originating from sidelobe ground scatterers are referred to as sidelobe clutter. The ground itself is rotating due to the earth's rotation. Thus, each receive antenna in the SAR-MTI system receives radar echoes from mainbeam clutter, sidelobe clutter, mainbeam 107 and sidelobe 110 jammers, ground targets, airborne targets and weather, over the duration of the waveform dwell. The region to be imaged 111 is restricted in range and azimuth because of limited system budget for items such as processing capacity, bandwidth, beamwidth, surveillance time, etc.

In the example application illustrated in FIG. 1, the requirements of the SAR-MTI system are to produce all-weather, day-or-night, high-resolution SAR imagery of a specified ground scene and to provide automated detection and localization of stationary and moving targets. The moving targets include ground targets as well as airborne targets. High resolution SAR imagery of moving targets is also required. The present invention satisfies these requirements. The fact that radar is used (rather than say IR) provides the all-weather, day-or-night capability.

RF Subsystems

Consider now the general form of the present invention illustrated in FIG. 2. The SAR-MTI radar includes N receiving antennas 21, each of which drives its own coherent radar receiver 22. The transmitter and the transmitting antenna(s) (if they are different from the receiving antennas) are not shown in FIG. 2. The transmitter is a conventional, coherent, SAR or MTI radar transmitter, based for example on TWT (traveling wave tube) technology. The receiving antennas (and the transmitting antenna(s)) can be independent apertures, or subapertures formed from one or more main apertures. They also could be independent feeds from a multi-feed (e.g. monopulse) antenna. For space-based applications, a preferred embodiment would form the transmitting and receiving antennas from one main aperture. The entire aperture (or a single subaperture) would be used on transmission, and at least two subapertures would be used on reception. The receive antennas would be designed to be as similar as possible. The receive aperture phase centers (17 in FIG. 1a) can be arranged with arbitrary spacings in an x-y-z Cartesian antenna coordinate system 23, as shown in FIG. 2a; however, the preferred arrangement for space-based applications would restrict the phase centers to be located in the plane of the main aperture, and ideally, on an axis yawed to be orthogonal to zero-velocity ground scatterers. This axis is almost parallel to the nominal platform velocity vector. For space-based applications, a preferred embodiment includes the ability to yaw the antenna over the satellite's orbit to compensate for the earth's rotation. The DPCA condition need not be satisfied in general and performance would still be maintainable with the use of ADOFs (which is a feature of the present invention); but in a preferred embodiment, the DPCA condition would be satisfied for at least one useful PRF. Conventional, stable coherent receivers 22 are used to receive the RF signals from each receive antenna, and to filter, downconvert and digitize the received signals producing a conventional, complex baseband representation for each digitized signal at the output of each receiver. The receivers would be manufactured to be as identical as possible in terms of their transfer function. Conventional means for calibrating the receivers is also assumed in a preferred embodiment, although not shown in FIG. 2. Although not explicitly indicated in FIG. 2, it is understood that for space-based applications, the digitized signals would likely (but not necessarily) be coded and transmitted to a ground station using a communications downlink, and all further processing indicated in FIG. 2 would be performed on the ground. Depending on the subsequent processing algorithms, range compression can immediately follow the coherent receivers, and precede the pseudochannele pseudochannel expansion stage.

Pseudochannel Expansion

The digitized signal (e.g. 24) from each receiver channel is expanded as shown in FIG. 2 to create a set of pseudochannels by passing the digitized signal through a delay network which provides a plurality of temporal taps 25, where each tap provides a different delayed version of the original signal. In FIG. 2, K pseudochannels 26 are shown coming out of the delay network that follows each receiver. In a preferred embodiment, the same number of pseudochannels (each providing a delayed pseudo-digitized signal) would be generated for all receiver channels. (Note: a different number of taps could be used in each receiver channel.) However, when a DPCA condition is satisfied by the antennas and a simple DPCA algorithm is used, different delay taps are usually used on each receiver channel so that the adaptive system used in a given MTI processor contains pseudochannels that are spatially arrested. The set of pseudochannels for each receiver channel are presented at the input 27 of a SAR processor 28. A partial internal detail of an embodiment of a SAR processor is shown in FIG. 2b. Input or feed 27 comprises K, or in general, a receiver specific plurality of $K_n$ (not shown) time delayed or displaced signals. A partial decomposition of SAR processing is effected by the provision of $K_n$ internal modules or SAR engines 29 in SAR processor 28.

SAR Processing

Figure 6:
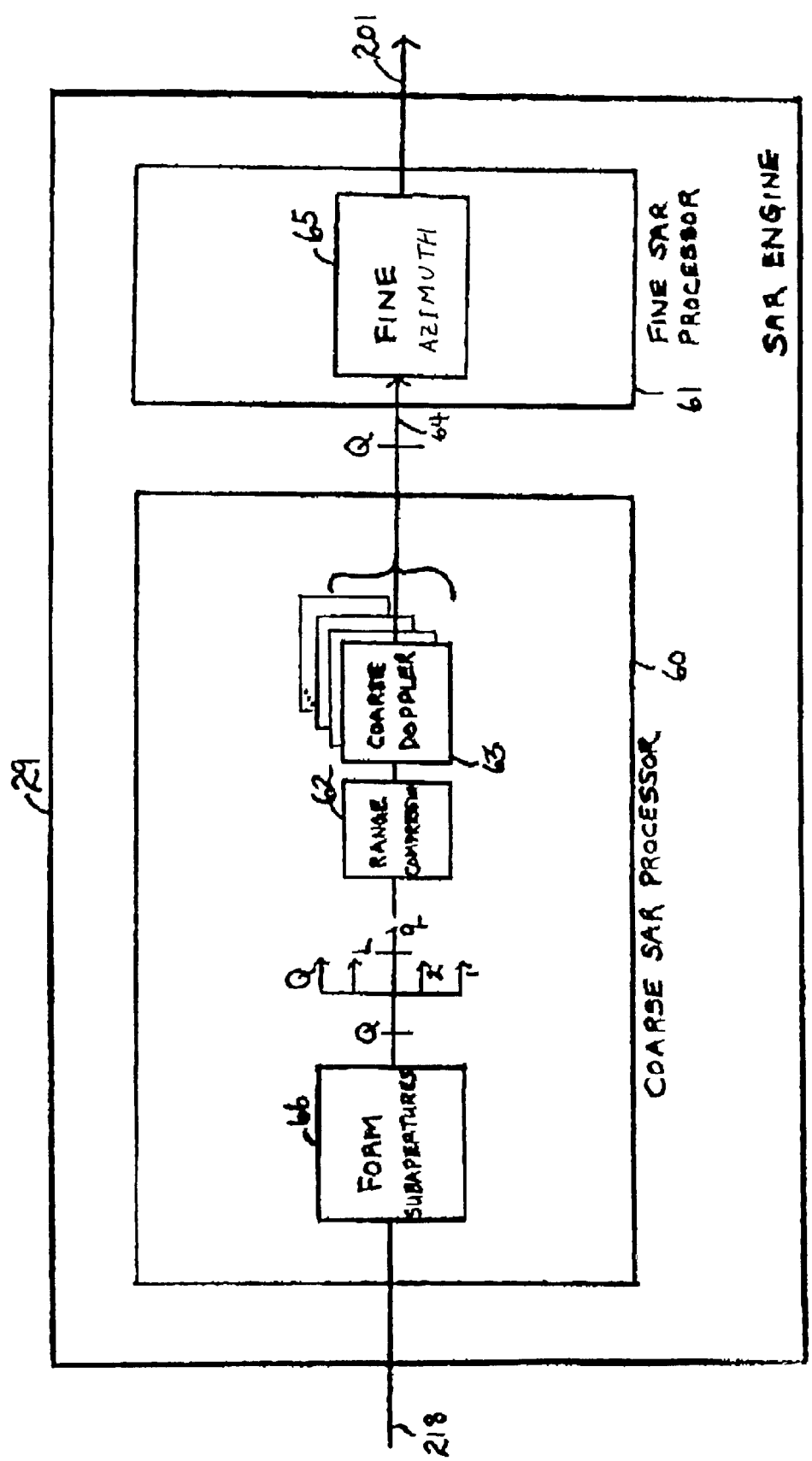
FIG. 6 illustrates a block diagram of a particular, subaperture SAR algorithm that can be used in the SAR Processor shown in FIG. 2.

SAR processing is performed by the SAR processor on all of the pseudochannels as shown in FIG. 2. Each of the K (in general) pseudochannels for each receiver is processed by a SAR Engine which implements conventional SAR processing algorithms to compress and focus each pseudo-digitized signal in the range-azimuth dimensions, for a given. If the dwell is short (e.g. tens of milliseconds or less), then conventional range-Doppler processing is all that is typically required. Conventional range-Doppler processing is performed by the Coarse SAR Processor (CSP) 60 shown in FIG. 6 and described below with reference to that drawing figure. The Fine SAR Processor (FSP) 61 also shown in FIG. 6 is not used in this mode of operation. Furthermore, the Form Subapertures module 66 would typically pass through the entire short-dwell signal; i.e. Q=1 in FIG. 6. For longer dwells (e.g. on the order of seconds), platform-induced range and azimuth migration typically results, requiring conventional SAR algorithms to be used. Handling for multi-look processing can also be provided by the SAR Engine, although not explicitly shown. A variety of SAR algorithms are available in the open literature and known to those skilled in the art. (For example, in Curlander and McDonough, Synthetic Aperture Radar Systems and Signal Processing, Wiley, 1991.) These algorithms are phase preserving, and provide the necessary (i.e. as a particular application requires) range compression, range migration correction (including range walk correction and range curvature correction), and azimuth compression needed to focus the signals in the range and azimuth. Hardware motion compensation techniques (e.g. ZRT adjustment, carrier phase and/or frequency variation) can simplify the digital processing. The output signal 201 of the SAR Engine is complex. As a result, the K signals 202 output from the SAR processor for each receiver are also complex.

MTI Processing

Before adaptive MTI processing is performed, space-time systems are formed by the Form Systems module 203 to create Z systems or groups of pseudochannel signals. Each system uses U pseudochannel signals taken from the output of their respective SAR processors. Given pseudochannel signals can be used in more than one system. In a preferred embodiment, all KN pseudochannel signals are grouped into a single adaptive system and subsequently processed by a single MTI module 204 to produce a single moving target output signal 205. However, there are applications where multiple MTI output signals are needed, which then require multiple systems to be formed. For example, if shorter dwells are used, two systems could be formed and processed by two MTI modules to suppress interference. The two moving target output signals could then be used to form monopulse angle estimates of detected moving targets, as shown in Nohara, "Design of a Space-Based Radar Signal Processor", IEEE Trans. Vol. AES-34, No. 2, April 1998.

MTI processing is performed on each system 206 of U pseudochannel signals. In FIG. 3, a subtractive DPCA, fixed MTI filter is shown, for the simplest case where U=2. This filter is the same as that used in U.S. Pat. No. 5,818,383. MTI processing is performed independently on each of the P Doppler bins for the U channels. FIG. 3 illustrates the fixed MTI processing for the $p^{th}$ Doppler bin. The second pseudochannel signal 32 is multiplied by a deterministically-computed, complex, scalar weight $w_p$ in a multiplier 33. The first pseudochannel signal 31 is subtracted from the weighted second pseudochannel signal 34 in a subtractor 35, producing the clutter-canceled signal 205 which is output from the MTI processor. The scalar weight $w_p$ corrects for the phase difference between the first pseudochannel signal 31 and the second (or $u^{th}$ in the general case where U>2) pseudochannel signal 32, and is different but known for each Doppler bin. Since fixed weights are used to match the clutter signals in the U channels, this MTI filter is not robust to unknown channel-to-channel variations caused by system imperfections or variabilities.

In FIG. 4, the adaptive MTI filter which is a unique feature of the present invention is shown. This adaptive MTI filter solves the robustness problems associated with the fixed MTI filter illustrated in FIG. 3. For example, by using different adaptive weights for each Doppler bin, the filter can correct for dissimilarities in the mainbeam and sidelobe antenna patterns of the receive antennas. The adaptive MTI filter provides other benefits as well. For example, it compensates for phases centers not satisfying a DPCA condition, thereby improving clutter cancellation. This benefit allows radar designs to decouple the waveform PRF from the antenna design, providing a more flexible radar. Another benefit provided by adaptive MTI is automatic interference suppression (e.g. mainbeam jammers) if sufficient ADOFs are available. Furthermore, since adaptive weights can be recomputed for different range intervals (for a given Doppler bin), improved clutter cancellation for nonhomogeneous clutter is also provided. Yet another benefit of the adaptive filter is that steeper filter responses can be formed with sufficient ADOFs, thereby allowing slow targets with radial velocities very close to the filter cutoff to escape severe attenuation. The net effect of this adaptive MTI filter is to provide higher SINR coming out of the filter, as compared to a fixed MTI filter such as that in FIG. 3. The higher SINR results in better detection and estimation performance. Now turning our attention to the details of FIG. 4, the U pseudochannels input to the filter 206 are organized so that their Doppler bins are readily accessible. The adaptive MTI processing for the $p^{th}$ Doppler bin is shown and is the same for the other Doppler bins. The set of $p^{th}$ Doppler bin pseudochannel signals 42 are input to a Compute Adaptive Weights (CAW) module 43 and a Hermitian Product (HP) module 45. The CAW module computes a plurality of weight vectors $w_p$ for the pth Doppler bin, each of length U. The plurality of weight vectors are designed to be used, respectively, on a corresponding plurality of range intervals (not shown in FIG. 4). In the simplest case, only a single weight vector is computed for each Doppler bin, and is applied by the HP module for the entire range interval. When nonhomogeneous clutter is expected, then the entire range interval is broken up into a set of homogeneous range intervals and a separate adaptive weight is computed and applied for each interval. In each interval, the CAW module collects a set of secondary data from the input data, and uses it to estimate the clutter statistics. The secondary data may be weighted by a target deweighting module to suppress target components in the secondary data (such as that described in Nohara, "Design of a Space-Based Radar Signal Processor", IEEE Trans. Vol. AES-34, No. 2, April 1998.) An adaptive weight vector (or bank of vectors) is computed from the secondary data by software simulating of a filter which whitens or rejects the clutter and passes through the moving target returns. The adaptive weight vector is typically computed in a conventional manner usually involving an estimate of the clutter covariance matrix, as described in Brennan et al., "Adaptive Arrays in Airborne MTI Radar", IEEE Trans. Vol. AP-24, September 1976, and in Kelly, "An Adaptive Detection Algorithm", IEEE Trans. Vol. AES-22, No. 1, March 1986. The HP module performs the filtering operation by forming the Hermitian product of a given weight vector with the subset of the pth Doppler bin pseudochannel signals 42 for which it was computed. The Hermitian product operation is done on a per range-bin basis. If there is a bank of weight vectors matched to targets with different characteristics, the best (maximum) product is chosen. As a result, a single, complex, range-Doppler matrix results at the output 205 of the MTI processor. It should be noted that MTI processing need not be performed on all P Doppler bins; but rather, only those Doppler bins where strong clutter is expected.

A unique feature of the present invention is the number of different STAP algorithms that can be implemented with it, the choice suited to the mission or application at hand. By appropriately specifying the set of taps to be used in the delay network for each receiver channel, and by selecting which pseudochannels are to be used in the formation of adaptive systems, different SAR-MTI algorithms result. Consider the example case where N=3 to illustrate the point. If K taps are provided for each of the three receive channels (typically K<4), and a single adaptive system is formed by the Form Systems module containing all 3K pseudochannel signals, then the invention of FIG. 2 effectively implements a 3-channel, Staggered-PRI SAR-MTI radar. The MTI Processor for this radar uses 3K ADOFs to improve clutter and interference suppression. For the special case where K=1, a Factored SAR-MTI radar results. For the case where K=1, but where receiver 1 uses the k=1 tap, receiver 2 uses the k=2 tap, and receiver 3 uses the k=3 tap, the present invention implements a 3-channel, adaptive DPCA SAR-MTI radar. If on the other hand, receiver 1 uses the k=1 tap, receiver 2 uses both the k=1 tap and the k=2 tap, and receiver 3 uses the k=2 tap, and if two systems are formed from receiver 1 tap 1 combined with receiver 2 tap 2 and receiver 2 tap 1 combined with receiver 3 tap 2, then an improved, adaptive version of the 3-channel clutter cancellation system used in U.S. Pat. No. 5,818,383 results.

Figure 5:
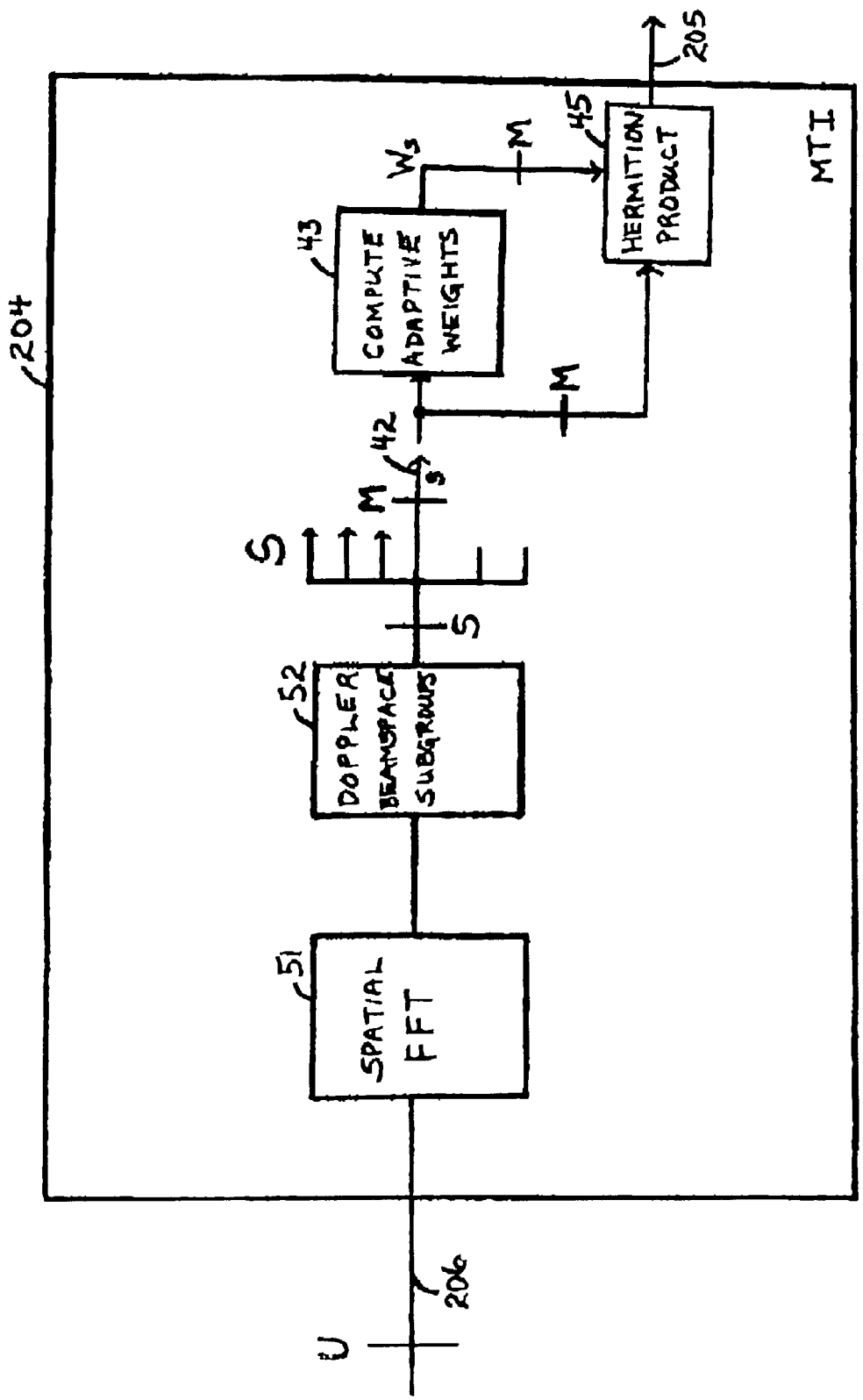
FIG. 5 illustrates a block diagram of a variation of the adaptive MTI algorithm illustrated in FIG. 4 which implements a joint-domain STAP algorithm.

FIG. 5 illustrates another form of the MTI processor 204 of the present invention, which creates additional ADOFs to improve clutter and interference suppression. In this form, the input data 206 are transformed and grouped into adaptive subgroups before presentation to the input of the CAW 43 and HP 45 modules which behave as before. The set of U input channels are all assumed to be spatial pseudochannels; i.e. they come from different receiver channels but all originate from the same temporal tap of their respective delay networks. Typically, K=1 when the processing of FIG. 5 is employed. An FFT is performed along the spatial dimension of the U input channels for every range-Doppler cell by the Spatial FFT module 51, resulting in a range-Doppler-beamspace signal. Next, S subgroups, each of size M, are formed in the Doppler-beamspace dimensions by the Doppler-Beamspace Subgroup module 52. That is, M contiguous Doppler-beamspace elements are contained in each subgroup. Each subgroup is then operated on by the CAW and HP modules in an analogous manner as described earlier in association with FIG. 4; the only difference being that U has been replaced by M in quantifying the size or dimension of the adaptive system. FIG. 5 illustrates the adaptive processing for the $s^{th}$ subgroup. The same processing is performed for each subgroup. When the MTI processor of FIG. 5 is used, the present invention of FIG. 2 is implements a Joint Domain SAR-MTI radar.

As a final note, STAP techniques can be applied using signal data collected before Doppler processing (This case is not shown in FIG. 2). However, these adaptive algorithms generally don't work as well as the aforementioned post-Doppler techniques because of their inability to track channel-to-channel differences (e.g. antenna pattern differences), and their need to have a DPCA condition satisfied.

Detection, Estimation and Imaging

Stationary scene imagery is computed in a conventional manner by the Stationary Imaging module 207 (FIG. 2) and is a system output. In the simplest case, one of the SAR-processed output signals 202 is envelope detected to form the SAR scene image. In addition, multi-look processing may or may not be employed to reduce image speckle. In a more complex implementation, a plurality of the SAR-processed output signals from one or more of the receiver channels could be coherently or noncoherently combined to form the output stationary scene imagery 208. Stationary targets are automatically detected and localized from the stationary scene imagery by the Detection and Estimation module 209. Conventional image processing detection algorithms are employed to detect stationary objects from the surrounding scene. Once detected, target locations (range-azimuth and geo-referenced coordinates) and sizes, and identification can be determined using conventional image processing algorithms such as centroiding. Target detection lists 210 are output from the Detection and Estimation module listing the detected targets and their characteristics, and are system outputs.

Moving target detection is performed with the Detection module 211 which operates on the outputs 205 from one or more MTI modules. In the simplest case, a single MTI output signal is processed by the Detection module. Alternatively, multiple MTI output signals could be combined coherently or noncoherently depending on the set up. Coherent combination may be beneficial if the antenna patterns and other signal processing parameters are such that SINR is improved without causing increased distortion. Noncoherent combination may be beneficial, for example, if multiple dwells are used with different carrier frequencies for better target integration. The Detection module applies conventional, range-Doppler CFAR algorithms such as cell-averaging CFAR, ordered-statistic CFAR, trimmed-mean CFAR, or even fixed threshold schemes, depending on the application. The basic algorithm is to compare the signal amplitude in each range-Doppler cell to a threshold. Those cells exceeding the threshold are declared as detections. CFAR detection schemes compute the threshold for each cell based on the amplitudes of surrounding reference cells. A moving target detection list 212 containing detected target locations is output by the module and represents a system output. In addition, normalized range-Doppler windows of data surrounding each detected target are attached to the list to assist the Estimation module and the Moving Target Imaging module.

Target parameter estimation is performed by the Estimation module 213. Like the Detection module, the Estimation module can operate on one or more MTI output signals, if available. The Estimation module uses conventional algorithms (such as maximum likelihood estimation or heuristics) to estimate target location, target velocity and target size. If two (or more) MTI output signals are available, interferometric techniques can be used to make high-resolution angle estimates (especially useful for shorter dwells). Good angle estimates can then be used to correct and improve initial target radial velocity estimates. If multiple subdwells are used in the MTI processing, then the set of target estimates from the collection of subdwells can be filtered using conventional tracking methods to produce target tracks. These tracks can be of assistance in improving moving target SAR imagery by employing autofocus methods. Target parameter estimates can also be used for target identification purposes. The set of target parameter estimates and/or tracks (with associated state vectors) are system outputs 214.

The Moving Target Imaging module 215 forms SAR imagery of the detected moving targets. In its simplest form, the normalized range-Doppler windows of data surrounding each detected target included in the detection list 212 are themselves the moving target SAR imagery which can be geo-referenced and output as a system output 217. If multiple subdwells are employed and target tracks are available from the Estimation module, it can be determined whether a specific target was maneuvering and is likely to be out of focus. If so determined, or desired, one or more pre-SAR, pseudochannel signals 27 can be selected using the Pre-SAR Switches 216 to form improved, autofocused, moving target imagery. In this case, the target track information is used to replace the standard matched filters used in the SAR processor with filters better matched to the maneuvering target.

Other Novel Improvements

In some applications, minimizing the computational cost of the RSP is a very important requirement. Coupled with the necessity to implement sophisticated, high-performing algorithms such as those associated with the present invention, the computational-cost versus performance trade-off can be particularly difficult to make. When several ADOFs are needed for adaptive MTI, the pseudochannel count increases; and performing SAR processing on each pseudochannel in FIG. 2 significantly increases the computational cost to implement the present invention in real-time. A preferred embodiment of the invention illustrated in FIG. 7 reduces the pseudochannel count before completing the computationally expensive SAR processing algorithms, by a clever integration of the SAR and MTI components. This reduction in channel count before completion of the SAR processing steps is unique to the present invention; and has the benefit of reducing the computational requirements of the present invention, making it more amenable to real-time implementation, while at the same time, not sacrificing the aforementioned performance benefits. To explain this innovative SAR-MTI embodiment, consider first the particular SAR Engine 29 decomposition shown in FIG. 6. A subaperture SAR algorithm is illustrated which is organized into a Coarse SAR Processor (CSP) 60, followed by a Fine SAR Processor (FSP) 61. The CSP produces a series of coarse Doppler images where significant range walk occurs between images, but not within any given image. In other words, each coarse Doppler image is focused without range migration correction. The input signal 218 is operated on by the Form Subapertures module 66 which forms Q subapertures by grouping the receive pulses into contiguous subdwells of L pulses, representing a sufficiently short duration. The subapertures can overlap, i.e. some of the L pulses are common to consecutive subapertures. The same range-Doppler processing is performed on each of the Q subapertures. Range compression is performed by the Range Compression module 62 in a conventional manner, followed by conventional Doppler processing by the Coarse Doppler module 63 resulting in Q coarse range-Doppler images 64 which emerge from the CSP. In cases where Doppler-intolerant waveforms are used, the Range Compression module can follow the Coarse Doppler module rather than precede it as shown in FIG. 6. In other cases, the range compression can occur earlier in the system, before the SAR algorithm. The Fine Doppler module 65 combines the coarse range-Doppler images by coherently integrating them. This integration includes conventional range migration correction algorithms to track the energy associated with a given range-Doppler cell through the Q coarse range-Doppler images. The output of the Fine Doppler module is a single, high-resolution, SAR-processed signal 201.

Figure 7:
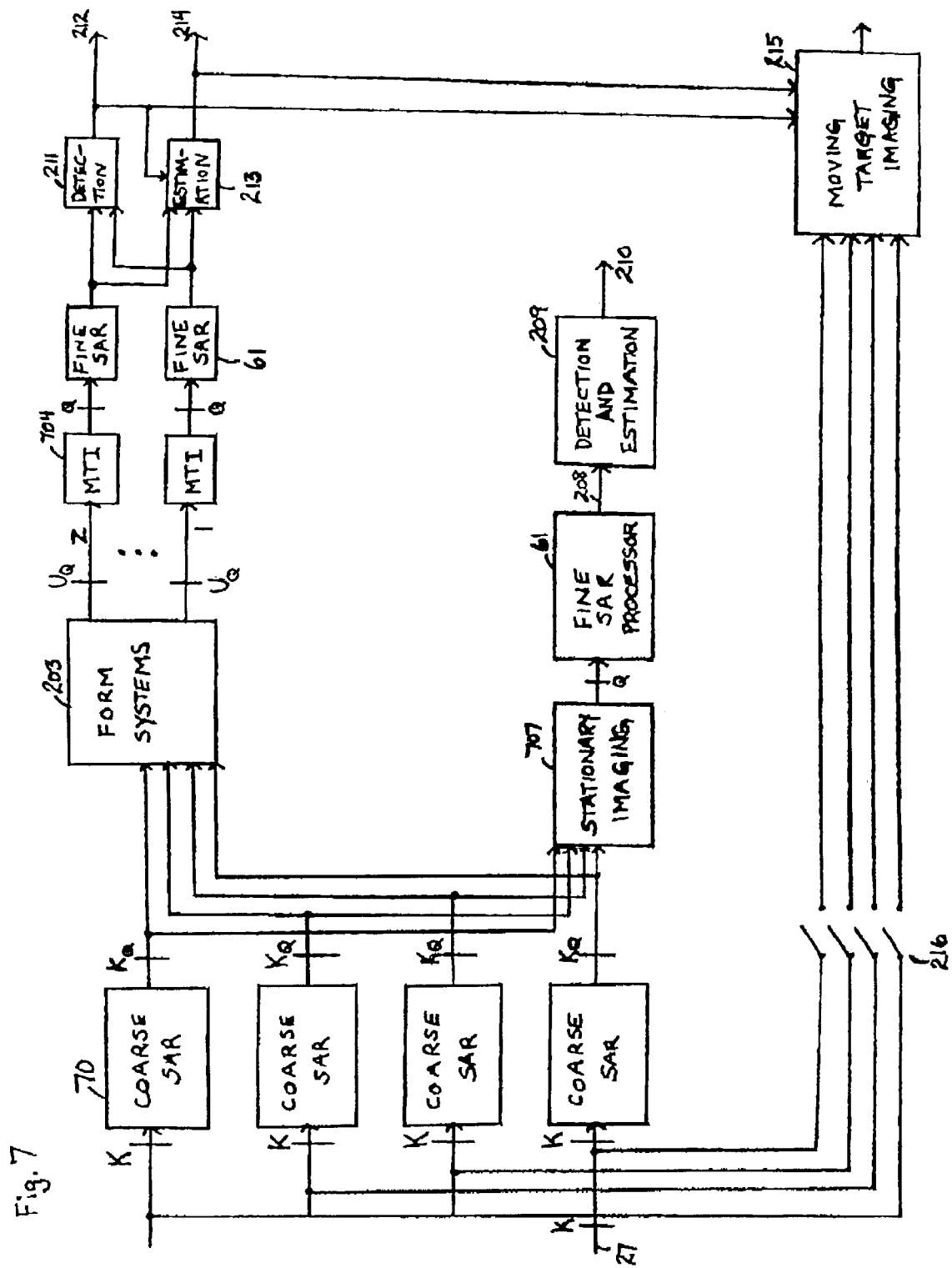
FIG. 7 illustrates a functional block diagram of a preferred embodiment of the present invention.

Now, if one moves the MTI module 204 in FIG. 2 forward into the SAR Processor 28 and more particularly, into the SAR Engine 29 contained therein, as decomposed in FIG. 6, so that the MTI module is applied immediately following the CSP, then the radar signal processor illustrated in FIG. 7 results. In comparing FIG. 7 and FIG. 2, one sees that the SAR Processor 28 is now replaced by a Coarse SAR Processor 70, which is the same as the Coarse SAR Processor 60 in FIG. 6 except that K channels are present at the input, each of which is processed in accordance with the CSP of FIG. 6. As a result of the coarse SAR processor, $K_Q$ pseudochannels are output, where the subscript Q indicates that each pseudochannel signal is now represented by Q subaperture signals. The Form Systems module 203 is unchanged. The MTI module 704 is the same as the MTI module 204 in FIG. 2 except that it is repeated independently Q times, using the respective Q subaperture signals. In this way, the $U_Q$ input channels are combined to produce a single output channel made up of the Q subapertures (or subdwells). The FSP 61 behaves as it did in FIG. 6 to form the high-resolution, SAR-processed signal. Detection and Estimation modules are unchanged from FIG. 2.

The Stationary Imaging module 707 in FIG. 7 is the same as the Stationary Imaging module 207 described in the context of FIG. 2 except that its operations are repeated independently Q times, over the Q subdwells associated with each of the KQ pseudochannel signals. Alternatively, if the performance versus cost tradeoff warrants it, an independent SAR Imaging module can be applied with the same generality as 207. The FSP module 61 completes the formation of the stationary scene imagery, and the Detection and Estimation module 209 is the same as that in FIG. 2.

The computational savings afforded by the design of FIG. 7 come about by postponing the computationally expensive FSP operations until the U MTI input channels have been reduced to a single output channel. As a result, the FSP operations are reduced by a factor of U. Since U relates to the ADOFs employed by the adaptive MTI processor, the performance improvements can be realized without the proportionate increase in computational cost. Although the MTI processing 704 performed in FIG. 7 must be repeated Q times, the reduced number of Doppler cells consistent with the shorter-duration subdwells means that the cost of each MTI process is proportionately reduced. In addition to the computation savings that are possible with the embodiment of FIG. 7, the moving target SAR imagery can also be improved by using autofocusing methods, as described earlier, which are suited the subdwell SAR decomposition.

The specific SAR decomposition illustrated in FIG. 6 is not intended to limit the scope of the embodiment illustrated in FIG. 7. Other SAR decompositions into "coarse" and "fine" stages with the MTI operation occurring between the coarse and fine steps are in the same spirit of the particular embodiment of the present invention illustration in FIG. 7.

Specific functionality and modules described herein, such as the compute adaptive weights module and the fast Fourier transform module, may be realized by any combination of dedicated hardware and software programmed general utility systems, including but not limited to application specific integrated circuits (ASIC), digital signal processors (DSP) and field programmable gate arrays (FPGA). The economic tradeoffs between development costs and size, weight, and power (SWAP) requirements will be obvious to one of ordinary skill in the art, and so the invention is not presumed to be limited in scope by a particular physical embodiment of the principles thereof. It may also be emphasized that, for simplicity of exposition, embodiments have been described wherein sets of repetitive pluralities, such as, for example, K, the number of signal delays, have been chosen identically. However, it is clear that in a more general embodiment, a sequence of distinct values, $K_1, \ldots, K_n, \ldots, K_N$, may be chosen, and in a similar manner for other multiplex signals. These generalizations and a method of denoting them will be clear to one of ordinary skill in the art, and be seen not to depart from the spirit of the invention.

It should be re-emphasized that the discussions surrounding preferred embodiments and specific examples are not intended to restrict to scope or spirit of the present invention from including other alterations, additions and deletions which are obvious to those skilled in the art.

What is claimed is:

1. A radar system comprising:
   at least one transmitting antenna connected to a pulsed radio frequency generator;
   a plurality of receiving antennas;
   a plurality of receivers connected to respective ones of said receiving antennas;
   a plurality of signal delays, each of said receivers being operatively connected to at least one of said signal delays to produce a plurality of delayed incoming radar signals in respective pseudochannels;
   a plurality of synthetic aperture radar (SAR) modules operatively connected to said receivers and said delays for operating on signals from said receivers and from said signal delays to produce a plurality of SAR-processed signals;
   a systems formation module coupled to outputs of said SAR modules for forming or selecting at least one grouping of said SAR-processed signals; and
   at least one moving target indication (MTI) module connected to said systems formation module for performing clutter suppression operations on said grouping of said SAR-processed signals.

2. The radar system of claim 1 wherein said SAR modules are coarse SAR processors, further comprising at least one fine SAR processor connected to an output of said MTI module.

3. The radar system of claim 2 wherein each of said first stages are coarse SAR processors that include a subaperture formation module, a range compression module, and a coarse Doppler calculation module.

4. The radar system of claim 3 wherein said second stage is a fine SAR processor that includes a fine azimuth calculation module.

5. The radar system of claim 2, further comprising a stationary imaging computation module connected to at least one of said SAR modules for producing a signal encoding stationary objects, further comprising at least one additional fine SAR processor connected to an output of said stationary imaging computation module.

6. The radar system of claim 5, further comprising a stationary target detection and estimation module for detecting and locating stationary targets, said stationary target detection and estimation module being connected to said additional fine SAR processor.

7. The radar system of claim 2 wherein said fine SAR processor is one of a plurality of fine SAR processors, further comprising a moving target detection module, each of said fine SAR processors being connected to said moving target detection module.

8. The radar system of claim 7, further comprising a moving target estimation module, each of said fine SAR processors and said moving target detection module being connected to said moving target estimation module.

9. The radar system of claim 1 wherein said systems formation module is a switching circuit forming a plurality of groupings of said SAR-processed signals, said MTI module being one of a plurality of MTI modules each receiving and operating on a respective one of said groupings of said SAR-processed signals.

10. The radar system of claim 9 wherein each of said MTI modules includes:
   an adaptive weight computation submodule generating at least one complex weight value for each Doppler bin of each of the SAR-processed signals in the respective one of said groupings, said computation submodule being connected at an input to said systems formation module; and
   a Hermitian product computation submodule connected at a first input to said adaptive weight module and at a second input to said systems formation module.

11. The radar system of claim 9 wherein each of said MTI modules is connected at an output to a moving target detection module.

12. The radar system of claim 11, further comprising a moving target estimation module, each of said MTI modules and said moving target detection module being connected to said moving target estimation module.

13. The radar system of claim 1, further comprising a stationary imaging computation module connected to at least one of said SAR modules for producing a signal encoding stationary objects.

14. The radar system of claim 13, further comprising a detection and estimation module connected to said stationary imaging computation module for detecting stationary objects and estimating associated parameters.

15. The radar system of claim 1 wherein at least one of said receivers is connected to a plurality of said signal delays having different delay values.

16. The radar system of claim 1 wherein said MTI module includes an adaptive weight computation submodule generating at least one complex weight value for each Doppler bin of each of the SAR-processed signals in said grouping, said computation submodule being connected at an input to said systems formation module, said MTI module further including a Hermitian product computation submodule connected at a first input to said adaptive weight module and at a second input to said systems formation module.

17. The radar system of claim 16 wherein said SAR modules consist of coarse SAR or range-Doppler processors for operating on short-dwell radar signals.

18. The radar system of claim 1 wherein said MTI module includes:
   a spatial Fast Fourier Transform (FFT) submodule connected at an input to said systems formation module;
   a beamspace subgrouping submodule connected at an input to said FFT submodule for forming Doppler beamspace subgroups of FFT transformed signals from said FFT module;
   an adaptive weight computation submodule generating at least one complex weight value for each Doppler bin of each of the subgroup signals from said beamspace subgrouping submodule, said computation submodule being connected at an input to said beamspace subgrouping submodule; and
   a Hermitian product computation submodule connected at a first input to said adaptive weight module and at a second input to said beamspace subgrouping submodule.

19. The radar system of claim 18 wherein said SAR modules consist essentially of coarse SAR or range-Doppler processors for operating on short-dwell radar signals.

20. The radar system of claim 1, wherein said MTI module is one of a plurality of MTI modules connected to said systems formation module, further comprising a moving target detection module, each of said MTI modules being connected at an output to said moving target detection module.

21. The radar system of claim 20, further comprising a moving target estimation module, each of said MTI modules and the moving target detection module being connected to said moving target estimation module.

22. The radar system of claim 21, further comprising a moving target imaging module connected at its input to outputs of the moving target detection module and moving target estimation module.

23. The radar system of claim 22 wherein the moving target imaging module is also operatively connected at its input to at least one pseudochannel signal.

24. The radar system of claim 1 where the arrangement of the transmit and receiving antennas is such that a displaced-phase-center-antenna condition is maintained for groups of pseudochannels.

25. The radar system of claim 1 wherein said MTI module is an adaptive moving target indication module.

26. The radar system of claim 1 wherein at least one of said signal delays is a zero delay.

27. The radar system of claim 1 wherein each of said receivers is operatively connected to at least two signal delays to produce at least two pseudochannels for each receiver channel, the signal delays being operatively connected to the respective SAR modules.

28. A radar signal processing method comprising:
   transmitting from a moving platform a series of radio-frequency pulses toward a ground surface;

receiving, via an antenna structure mounted to said moving platform, radar signals reflected from stationary and moving objects;

digitizing the received radar signals;

operating on the digitzed radar signals to produce a plurality of pseudo-radar signals in respective pseudochannels;

processing the pseudo-radar signals to produce a plurality of SAR-processed signals;

forming or selecting at least one grouping of said SAR-processed signals; and performing clutter suppression operations on said grouping of said SAR-processed signals.

29. The method of claim 28, further comprising:

forming a plurality of groupings of said SAR-processed signals; and performing clutter suppression operations on each of said groupings of said SAR-processed signals.

30. The method of claim 29 wherein the performing of said clutter suppression operations includes:

generating a complex weight value for each contiguous range-azimuth sub-image of each of the SAR-processed signals in each of said groupings; and computing a Hermitian product of the generated complex weight values and respective portions of the SAR-processed signals.

31. The method of claim 30 where the complex weight values are computed using an adaptive weight computation submodule to adaptively generate optimum weights.

32. The method of claim 28 wherein the operating on said delayed signals and said real-time signals includes performing a first stage of SAR processing, further comprising performing a second stage of SAR processing after performing of said clutter suppression operations on said grouping of said SAR-processed signals.

33. The method of claim 28 wherein the performing of said clutter suppression operations includes:

generating a complex weight value for each contiguous range-azimuth sub-image of SAR-processed signals in said grouping; and computing a Hermitian product of the generated complex weight values and respective portions of the SAR-processed signals.

34. The method of claim 33 where the complex weight values are computed using an adaptive weight computation submodule to adaptively generate optimum weights.

35. The method of claim 28, further comprising:

performing detection operations on clutter-suppressed signals; and performing estimation of target parameters for detected moving targets including the formation of moving target tracks.

36. The method of claim 35, further comprising:

performing moving target imaging using the available detection and estimation data along with the pseudochannel signals themselves.

37. The method of claim 28, further comprising:

performing stationary imaging of stationary objects; and performing detection and estimation of stationary objects.

38. The method of claim 28, wherein the performing of said clutter suppression operation includes:

performing a spatial Fast Fourier Transform (FFT) on each of the SAR-processed signals in each of said groupings; and forming Doppler-beamspace subgroups of FFT transformed signals; and generating at least one adaptive complex weight vector per subgroup of the same dimension as each subgroup in each of said groupings; and computing a Hermitian product of the generated adaptive complex weight vectors and respective portions of the subgroup signals.

39. A synthetic aperture moving target indication radar system, comprising:

a transmitting antenna connected to a radio frequency generator;

a plurality of a cardinality N>1 of receiving antennas 1, ..., n, ..., N;

a plurality of said cardinality N of respective coherent radio frequency receivers connected to respective said receiving antennas;

a collection of sets of cardinalities $K_n 1$ of signal delay taps 1, ..., k, ... $K_n$ connected to feeds of respective said receiving antennas for creating time-displaced signals at delays $t_l$, ..., $t_k$, ..., $t_{Kn}$;

a plurality of said cardinality N>1 of SAR processors operatively connected to respective said sets of signal delay taps for performing SAR processing on respective sets of said time-displaced received signals and outputting respective pluralities of said cardinality $K_n$ of SAR processed time-displaced signals, each said processed time-displaced signal further comprising a plurality $P_{nk}$ of outputs in Doppler bins 1, ..., p, ... $P_{nk}$;

a system formation module for selecting a group of a cardinality Z of subsets of cardinalities $U_l$, ..., $U_z$, ..., $U_Z$ from a total possible collection of cardinality $K_l + ... + K_n + ... + K_N$ of said SAR processed delayed signals; and a plurality of a cardinality Z of MTI processing modules 1, ..., z, ..., Z for producing moving target indication output signals from each respective subset $U_z$ of SAR processed delayed signals.

40. The radar system of claim 39 wherein said SAR processors further respectively comprise $K_n$ SAR engines operatively connected in a parallel configuration to respective elements of a $K_n$-fold input comprising said time-displaced signals at delays $t_l$, ..., $t_k$, ..., $t_{Kn}$ for implementing SAR processing algorithms to compress and focus said signals.

41. The radar system of claim 40 wherein said delays $t_l$, ..., $t_k$, ..., $t_{Kn}$ are of form 0, ..., (k-1)T, ..., ($K_n$-1)T, for a fixed positive time interval T for all n.

42. The radar system of claim 40 wherein said $P_{nk}$ are of form $P_{nk}$=P for a fixed cardinality P for all n.

43. The radar system of claim 39 wherein each said MTI processing module further comprises:

a splitter, for isolating a composite partial signal comprising a said output in an azimuth bin p from each of respective elements 1, ..., u, ..., $U_z$ of said subsets $U_z$;

a plurality of said cardinality P of adaptive weight computation modules, for computing a complex adaptive weight wp vector from each of respective said partial signals; and an plurality of cardinality P of Hermitian product modules for forming a complex inner product from each of respective adaptive weight vectors $w_p$ and respective said composite signals, for forming a plurality of complex scalar outputs of the MTI processing module.

44. The radar system of claim 39 wherein each said MTI processing module z further comprises:

an FFT module, for performing a Fourier transform of an input data signal considered as a spatial signal indexed by a discrete spatial variable taking on values in $1, \ldots, u, \ldots, U_z$ in respective said doppler bins p drawn from a set of doppler bins $1, \ldots p, \ldots, P$;

a Doppler-Beamspace Subgroup module for forming a set of a cardinality $S_z$ of groups $1 \ldots, s, \ldots S_z$ of respective cardinalities $M_s$ of outputs of said FFT module;

an plurality of said cardinality $S_z$ of adaptive weight computation modules for computing a complex adaptive weight $w_s$ from each of respective said sets of cardinality $M_s$; and an plurality of said cardinality $S_z$ of Hermitian product modules for forming a complex inner product from each of respective adaptive weights $w_s$ and each of respective said partial signals, for forming a plurality of complex scalar outputs of said MTI processing module.

45. A synthetic aperture moving target indication radar system, comprising:

a transmitting antenna connected to a radio frequency generator;

a plurality of cardinality N>1 of receiving antennas $1, \ldots, n, \ldots, N$ connected to respective coherent radio frequency receivers;

a plurality of sets of cardinalities $K_n1$ of signal delay taps $1, \ldots, k, \ldots K_n$ connected to feeds of respective said receiving antenna for creating time-displaced signals of delays $t_l, \ldots, t_k, \ldots, t_{Kn}$ a plurality of said cardinality N of coarse SAR processing modules operatively connected to respective said sets of signal delay taps for producing sets of coarse Doppler image signals of a cardinality Q;

a system formation module connected to outputs of said plurality of coarse SAR processing modules for selecting a collection of a cardinality $Z_Q$ of subsets of cardinalities $U_l, \ldots, U_z, \ldots, U_Z$ of a total collection of size N x Q of said SAR processed delayed signals;

a plurality of a cardinality $Z_Q$ of MTI processing modules $1, \ldots, Z, \ldots, Z_Q$ connected to outputs of said systems formation module for producing moving target indication output signals from each respective subset $U_z$ of SAR processed delayed signals; and a plurality of cardinality $Z_Q$ of fine SAR processors for coherent$_l$y integrating respective Q-fold signal output from said MTI processing modules.

* * * * *